United States Patent
Lai et al.

(10) Patent No.: US 9,433,935 B2
(45) Date of Patent: Sep. 6, 2016

(54) SYNTHESIS OF FRAMEWORK MODIFIED ZSM-48 CRYSTALS

(71) Applicants: Wenyih Frank Lai, Bridgewater, NJ (US); Lei Zhang, Basking Ridge, NJ (US)

(72) Inventors: Wenyih Frank Lai, Bridgewater, NJ (US); Lei Zhang, Basking Ridge, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 251 days.

(21) Appl. No.: 14/228,568

(22) Filed: Mar. 28, 2014

(65) Prior Publication Data

US 2015/0273450 A1    Oct. 1, 2015

(51) Int. Cl.
| | |
|---|---|
| *C10G 45/64* | (2006.01) |
| *C10G 45/62* | (2006.01) |
| *B01J 29/89* | (2006.01) |
| *B01J 29/70* | (2006.01) |
| *B01J 29/04* | (2006.01) |
| *C01B 39/48* | (2006.01) |
| *B01J 29/74* | (2006.01) |
| *B01J 29/78* | (2006.01) |
| *B01J 35/00* | (2006.01) |

(52) U.S. Cl.
CPC ............. *B01J 29/703* (2013.01); *B01J 29/048* (2013.01); *B01J 29/89* (2013.01); *C01B 39/48* (2013.01); *C10G 45/62* (2013.01); *C10G 45/64* (2013.01); *B01J 29/7461* (2013.01); *B01J 29/7861* (2013.01); *B01J 35/002* (2013.01); *B01J 2229/183* (2013.01); *B01J 2229/186* (2013.01); *B01J 2229/36* (2013.01); *B01J 2229/40* (2013.01); *B01J 2229/42* (2013.01)

(58) Field of Classification Search
CPC ...... B01J 29/048; B01J 29/70; B01J 29/703; B01J 29/89; C10G 45/62; C10G 45/64
See application file for complete search history.

(56) References Cited

U.S. PATENT DOCUMENTS

| | | | |
|---|---|---|---|
| 3,354,078 A | 11/1967 | Miale et al. | |
| 5,075,269 A | 12/1991 | Degnan et al. | |
| 5,282,958 A * | 2/1994 | Santilli .................. | C10G 45/64 208/111.15 |
| 5,419,830 A * | 5/1995 | Chou ..................... | C10G 45/64 208/108 |
| 5,961,951 A | 10/1999 | Kennedy et al. | |
| 6,923,949 B1 | 8/2005 | Lai et al. | |
| 7,482,300 B2 | 1/2009 | Lai et al. | |
| 2007/0131581 A1* | 6/2007 | Lai et al. ........................ | 208/27 |
| 2010/0105542 A1* | 4/2010 | Lin et al. ........................ | 502/74 |
| 2011/0174684 A1 | 7/2011 | Prentice et al. | |

OTHER PUBLICATIONS

Chorkendorff, I. et al. (2007). Concepts of Modern Catalysis and Kinetics, 2$^{nd}$ ed., Wiley-VCH, 457 pgs [Office action cites p. 197].*
Weisz et al., "Superactive Crystalline Aluminosilicate Hydrocarbon Catalysts," Journal of Catalysis, (1965), vol. 4, pp. 527-529.

(Continued)

*Primary Examiner* — Brian McCaig
(74) *Attorney, Agent, or Firm* — Robert A. Migliorini

(57) ABSTRACT

Methods are provided for synthesis ZSM-48 crystals (or other MRE framework crystals) having heteroatoms different from silicon and aluminum incorporated into the framework structure, and use of such crystals for applications such as catalytic processing of hydrocarbonaceous feeds. Examples of heteroatoms can include titanium, zirconium, and zinc.

13 Claims, 5 Drawing Sheets

(56) References Cited

OTHER PUBLICATIONS

Miale et al., "Catalysis by Crystalline Aluminosilicates IV. Attainable Catalytic Cracking Rate Constants and Superactivity," Journal of Catalysis, (1966), vol. 6, pp. 278-287.
Reddy et al., "Synthesis of titanium containing silica ZSM-48 (TS-48) using hexamthonium hydroxide as template," Catalysis Letters, (1994), vol. 23, pp. 169-173.
Serrano et al., "Synthesis of Titanium-containing ZSM-48," J. Chem. Soc., Chem. Commun., (1992), pp. 745-747.
Fan et al., "Catalytic Performances of Metallosilicates with ZSM-48 Structure," 12th International Zeolite Conference, (1999).
Fan et al., "Synthesis and Characterization of Fe- and Cr-Containing Silicates Having ZSM-48 Structure Prepared with a Low Amount of 1,6-Hexanediamine," 12th International Zeolite Conference (1999).
Olson, et al., "Chemical and Physical Properties of the ZSM-5 Substitutional Series," Journal of Catalysis, (1980), vol. 61, pp. 390-396.
The International Search Report and Written Opinion of PCT/US2015/017974 dated Nov. 9, 2015.
Reddy, K. Madhusudan et al., "Synthesis and characterization of TS-48, a titanium containing silica analog of ZSM-48," Catalysis Letters, 1994, vol. 23, No. 1-2, pp. 175-187.
Tuel, A. et al., "A new template for the synthesis of titanium silicates with the ZSM-48 structure," Zeolites, 1995, vol. 15, No. 2, pp. 164-170.
Reddy, K. Madhusudan et al., "Synthesis of titanium containing silica ZSM-48 (TS-48) using hexamethonium hydroxide as template," Catalysis Letters, 1994, vol. 23, pp. 169-173.
Giordano, G. et al., "Zeolite synthesis in presence of hexamethonium ions," Journal of Molecular Catalysis A, 2009, vol. 305, No. 1-2, pp. 34-39.

* cited by examiner

SYNTHESIS OF FRAMEWORK MODIFIED ZSM-48 CRYSTALS

FIELD

Zeolites with heteroatoms incorporated into the zeolite framework structure are described along with methods for preparing the same.

BACKGROUND

Zeolite crystal structures have found a wide range of applications within refinery processes and other processes for manipulating petroleum streams. Some zeolite applications are catalytic in nature, while other applications focus on the ability of zeolites to selectively adsorb molecules within a gas stream.

One type of zeolite structure used for catalytic processing of petroleum streams is ZSM-48, which is a zeolite of the MRE framework type. As for many zeolites, the composition of the synthesis mixture used to form ZSM-48 (or other MREM framework type zeolites) can have a strong impact on the crystalline structure and/or morphology of the resulting zeolites.

U.S. Pat. No. 6,923,949 describes methods for forming ZSM-48 crystals using synthesis mixtures that include non-ZSM-48 seed crystals. The resulting ZSM-48 crystals can have an X-ray diffraction pattern corresponding to ZSM-48, although the presence of the non-ZSM-48 seed crystals can be detected based on activity tests. For crystals having a silica to alumina ratio of 70 to 1 to 150 to 1, the ZSM-48 crystals formed using non-ZSM-48 seeds are described as being small, irregularly shaped crystals that are free from fibrous morphology. For crystals with a silica to alumina ratio of less than 70 to 1, the ZSM-48 crystals are described as being mixtures of small, irregularly shaped crystals and needle morphology crystals.

U.S. Pat. No. 7,482,300 describes methods for forming ZSM-48 crystals without the use of non-ZSM-48 seeds in the synthesis mixture for forming the crystals. The structure directing agent used for forming the ZSM-48 crystals is described as a hexamethonium salt, such as hexamethonium chloride. The resulting crystals can have a silica to alumina ratio from 70 to 1 to 110 to 1, and are described as being substantially free of fibrous morphology. Preferred ranges are also described for the molar ratio of OH$^-$ to SiO$_2$ and the molar ratio of structure directing agent (or template) to SiO$_2$. The preferred ranges are described as suitable for formation of crystals that are substantially free of needle-like morphology crystals.

SUMMARY

In one aspect, a method of dewaxing a hydrocarbonaceous feedstock is provided. The method includes exposing a feedstock under effective dewaxing conditions to a catalyst comprising ZSM-48 crystals containing at least one of titania, zirconia, or zinc oxide as a framework metal oxide in a ZSM-48 structural framework, a molar ratio of SiO$_2$ to the framework metal oxide in the ZSM-48 structural framework being 70 to 200, a molar ratio of SiO$_2$ to Al$_2$O$_3$ in the ZSM-48 structural framework being at least 120.

In another aspect, a method of synthesizing ZSM-48 crystals containing at least one of titania, zirconia, or zinc oxide as a framework metal oxide in a zeolite structural framework is provided. The method includes crystallizing a reaction mixture comprising a source of water, a source of SiO$_2$, a source of the framework metal oxide, a source of an alkali metal M, and a source of a structure directing agent in the form of an organic cation, Q, the reaction mixture having a molar ratio of structure directing agent cation, Q, to SiO$_2$ in said reaction mixture of 0.01 to 0.2; a molar ratio of SiO$_2$ to framework metal oxide in said reaction mixture of 50 to 225; a molar ratio of water to SiO$_2$ in said reaction mixture of 1 to 500; a molar ratio of hydroxyl group concentration to SiO$_2$ in said reaction mixture of from 0.1 to 0.5; a molar ratio of alkali metal, M, to SiO$_2$ in said reaction mixture of from 0.05 to 0.5; and a molar ratio of SiO$_2$ to Al$_2$O$_3$ in said reaction mixture of at least 120.

DETAILED DESCRIPTION

Figure 1:
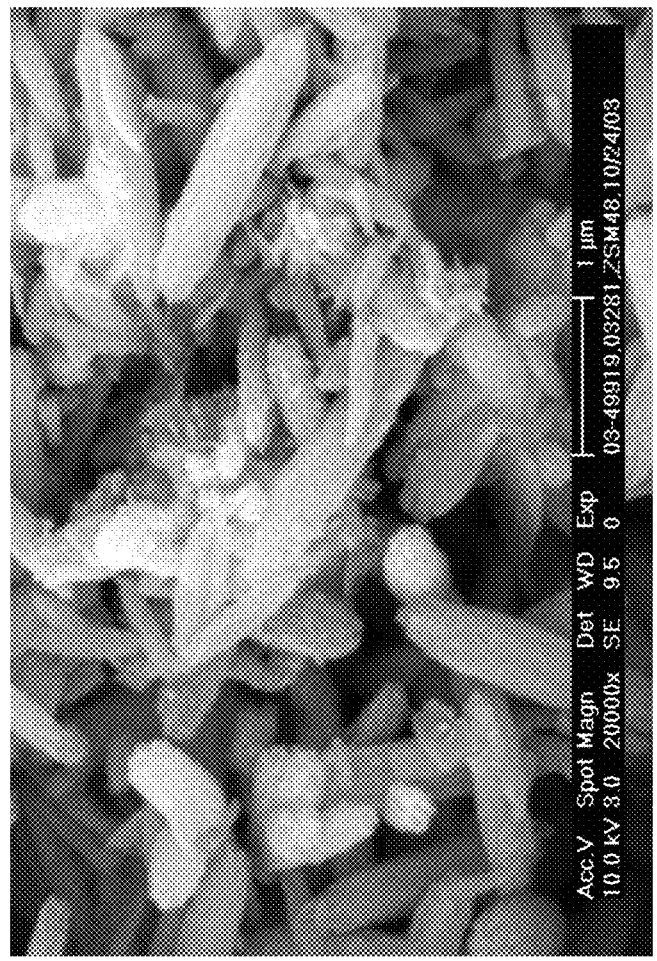
FIG. 1 shows an SEM image of ZSM-48 crystals.

All numerical values within the detailed description and the claims herein are modified by "about" or "approximately" the indicated value, and take into account experimental error and variations that would be expected by a person having ordinary skill in the art.

In various aspects, methods are provided for synthesis ZSM-48 crystals having heteroatoms different from silicon and aluminum incorporated into the framework structure. Examples of heteroatoms can include titanium, zirconium, and zinc. In other aspects, compositions of matter corresponding to such ZSM-48 crystals are also described. In still other aspects, methods for using ZSM-48 crystals having heteroatoms different from silica and alumina incorporated into the framework structure in catalytic processing of petroleum (hydrocarbon) feeds is described. In yet other aspects, the methods described herein can generally be applied to synthesis of zeolites having the MRE framework structure, as described in the zeolite database maintained by the International Zeolite Association.

In various embodiments, the ZSM-48 crystals recovered from a reaction mixture can correspond to substantially pure ZSM-48 crystals. Substantially pure ZSM-48 crystals are defined herein as ZSM-48 crystals that contain less than 10 wt % of another type of zeolite, such as ZSM-50. Preferably, the substantially pure ZSM-48 crystals can contain less than 5 wt % of another type of zeolite, such as less than 3 wt % of another type of zeolite, or less than 1 wt % of another type of zeolite. More preferably, the substantially pure ZSM-48 crystals can contain less than 10 wt % of another type of zeolite (such as ZSM-50) or an impurity such as Kenyaite. In such aspects, the substantially pure ZSM-48 crystals can contain less than 5 wt % of another type of zeolite or impurity, such as less than 3 wt % of another type of zeolite or impurity, or less than 1 wt % of another type of zeolite or impurity.

In some aspects, the ZSM-48 crystals can be can be "as-synthesized" crystals that still contain the organic template/structure directing agent, or the crystals can be calcined crystals, such as Na-form ZSM-48 crystals, K-form ZSM-48 crystals, or Li-form ZSM-48 crystals. Additionally or alternately, the crystals can be calcined and ion-exchanged crystals, such as H-form ZSM-48 crystals.

The X-ray diffraction pattern (XRD) of the ZSM-48 crystals according to the disclosure is that exhibited by ZSM-48, i.e., the D-spacings and relative intensities correspond to those of pure ZSM-48. An example of a suitable device for determining a diffraction pattern is a Bruker D4 Endeavor instrument, manufactured by Bruker AXS, and equipped with a Vantec-1 high-speed detector. The instrument can be run using a silicon powder standard (Nist 640B) which is a material without stress. On such an instrument, the full-width half-maximum (fwhm) for the standard peak at 28.44 degrees 2 theta is 0.132. The step size can be 0.01794 degrees and the time/step can be 2.0 seconds. The 2 theta scan can use a Cu target at 35 kv and 45 ma.

While XRD can be used to establish the identity of a given zeolite, it cannot be used to distinguish a particular morphology. For example, the needle-like and platelet forms for a given zeolite will exhibit the same diffraction patterns. In order to distinguish between different morphologies, it is necessary to use an analytical tool with greater resolution. An example of such a tool is scanning electron microscopy (SEM). Photomicrographs from SEM can be used to identify crystals with different morphologies.

The ZSM-48 crystals after removal of the structural directing agent can have a can have a molar composition according to one of several general formulas. For ZSM-48 crystals containing silica and alumina (including highly siliceous ZSM-48), the general formula can be expressed as $(n)SiO_2:Al_2O_3$. Depending on the type of ZSM-48, n can range from 120 to 225. For example, n can be at least 120, or at least 125, or at least 130, or at least 135. Additionally or alternatively, n can be 225 or less, or 200 or less, or 180 or less. The lower and upper range bounds identified above are explicitly contemplated as being combined in any convenient combination. Thus, n can range from 120 to 200, or 120 to 180, or 125 to 225, or 125 to 200, or 125 to 180, or 130 to 180, and so on. In still other aspects, ZSM-48 crystals with low or minimal alumina contents can be used. The upper limit on the silica to alumina ratio in such aspects can depend on the amount of alumina naturally present in the source of silica used for synthesizing the ZSM-48 (and/or the amount of alumina naturally present in other reagents). In such aspects, the ZSM-48 crystals can be substantially free of intentionally added alumina, which can correspond to a silica to alumina ratio of at least 250, or at least 500. For example, n can be 120 to 1500 (or higher), or 120 to 1000, or 250 to 1500 (or higher), or 400 to 1500 (or higher), or 500 to 1500 (or higher).

Some other types of ZSM-48 crystals can include silica and one or more oxides different from silica or alumina as part of the framework structure. For example, some ZSM-48 crystals can include silica and one or more of titania, zirconia, or zinc oxide as a framework metal oxide. In this description, references to a ratio of silica to a framework metal oxide are defined as a ratio of silica to other divalent or tetravalent oxides. Thus, references to a ratio of silica to a framework metal oxide do not include alumina, as the silica to alumina ratio is separately provided. For each of these other types of metal oxides that are incorporated into the zeolite framework structure, the ZSM-48 crystals (after removal of the structural directing agent) can have a molar composition according to the general formula $(n)SiO_2:(XO_2)_2$, where X is a tetravalent element such as Ti or Zr; or the general formula $(n)SiO_2:(XO)_2$, where X is a divalent element such as Zn. For metal oxides other than alumina, the number of silica units is expressed relative to a number of pairs of $XO_2$ or XO units to facilitate comparison with molar ratios involving alumina. Since an alumina unit is $Al_2O_3$, a "single" alumina unit contains two aluminum atoms. For oxides other than alumina, it is believed that the ratio of silica to a basic unit that contains two metal atoms provides a better comparison between Al-ZSM-48 crystals and ZSM-48 crystals containing other types of metal oxides. Thus, the molar ratios herein (unless specified otherwise) will refer to molar ratios of $SiO_2$ versus either $(XO_2)_2$ or $(XO)_2$.

In various aspects, for the general formula $(n)SiO_2:(XO_2)_2$, where X is a tetravalent element such as Ti or Zr, n can range from 70 to 225. For example, n can be at least 70, or at least 80, or at least 90, or at least 100, or at least 110, or at least 125. Additionally or alternatively, n can be 200 or less, or 180 or less, or 150 or less, or 120 or less, or 110 or less, or 100 or less, or 90 or less. The lower and upper range bounds identified above are explicitly contemplated as being combined in any convenient combination. Thus, n can be 70 to 225, or 70 to 200, or 70 to 180, or 80 to 225, or 90 to 225, or 80 to 200, or any other convenient combination.

Similarly, for the general formula $(n)SiO_2:(XO)_2$, where X is a divalent element such as Zn, n can be at least 70, or at least 80, or at least 90, or at least 100, or at least 110, or at least 125. Additionally or alternatively, n can be 225 or less, or 200 or less, or 180 or less, or 150 or less, or 120 or less, or 110 or less, or 100 or less, or 90 or less. The lower and upper range bounds identified above are explicitly contemplated as being combined in any convenient combination. Thus, n can be 70 to 225, or 70 to 200, or 70 to 180, or 80 to 225, or 90 to 225, or 80 to 200, or any other convenient combination.

In still other types of ZSM-48 crystals, the crystals can include silica, alumina, and one or more other types of oxides, leading to a general formula of $(a)SiO_2:(b)Al_2O_3:(c)XO_2:(d)XO$. In this general formula, the ratio of a:b can have any of the values described above for "n" for the ratio between silica and alumina, and independently the ratio of a:c and/or a:d can have any of the values described above for "n" for the ratio of silica to titania, zirconia, and/or zinc oxide. Additionally or alternatively, the ratio of a:b, a:c, or a:d can be at least 50, such as at least 60.

The as-synthesized form of ZSM-48 crystals can be prepared from a mixture having silica, optionally added alumina, optionally an added source of another tetravalent and/or divalent metal such as titania, zirconia, or zinc oxide, base, and a structural directing agent, such as a hexamethonium salt directing agent.

For any given preparation of the as-synthesized form of ZSM-48 crystals, the molar composition can contain silica, alumina, optionally one or more other tetravalent oxides, and directing agent. Generally, the molar ratios of sources of silica to sources of alumina and/or sources of tetravalent or divalent metal oxides can be similar to the molar ratios described above for the as-synthesized ZSM-48 crystals. It should be noted, however, that the as-synthesized form of ZSM-48 crystals may have molar ratios different from the molar ratios of reactants of the reaction mixture used to prepare the as-synthesized form. This result may occur, for example, due to incomplete incorporation of 100% of the reactants of the reaction mixture into the crystals formed (from the reaction mixture). Thus, the molar ratio of the sources of silica and other metal oxides in the reaction mixture is a rough guide to the expected ratio in the resulting crystals, but variations can occur depending on the synthesis conditions.

The as-synthesized form of ZSM-48 crystals can be prepared from an (aqueous) reaction mixture silica or silicate salt; optionally added alumina or soluble aluminate salt; optionally an added source of another tetravalent and/or divalent metal such as titania, zirconia, or zinc oxide; base; and a template or structural directing agent, such as a hexamethonium salt directing agent. In various aspects, the reactants in reaction mixture can have the following molar ratios: $SiO_2:Al_2O_3$=120 to 225, or 120 to 500, or at least 250 (upper end defined by non-intentionally added alumina, such as 1500 or higher), or at least 500 (upper end defined by non-intentionally added alumina, such as 1500 or higher); $SiO_2:(XO_2)_2$=70 to 200; $SiO_2:(XO)_2$=70 to 200; $H_2O:SiO_2$=1 to 500; $OH^-:SiO_2$=0.1 to 0.3, such as 0.14 to 0.18; template: $SiO_2$=0.01-0.20.

The silica source can preferably be precipitated silica and is commercially available from Evonik Degussa. Other silica sources include powdered silica including precipitated silica such as Zeosil™ and silica gels, silicic acid colloidal silica such as Ludox™ or dissolved silica. In the presence of a base, these other silica sources may form silicates. The alumina or other framework metal oxide (such as titania, zirconia, or zinc oxide) may be in the form of a soluble salt. Suitable aluminum sources can include aluminum salts such as the chloride, aluminum alcoholates or hydrated alumina such as gamma alumina, pseudobohemite and colloidal alumina. Similarly, sources for other metal oxides can be metal oxide salts or other precursor compounds that can provide metal oxide for the zeolite framework in the synthesis mixture. The base used to dissolve the metal oxide can be any alkali metal hydroxide, ammonium hydroxide, diquaternary hydroxide and the like.

In various aspects, the structure directing agent can be a salt based on a diquaternary ammonium cation. In particular, the cation portion of the salt can be represented by the formula $R_1$-$R_3$-$R_2$, where $R_1$ and $R_2$ are the same or different. $R_1$ and $R_2$ can be tetraalkylammonium groups having the formula $R_3$—$N^+$—RR'R", where R, R', and R" can each be alkyl groups and can each be the same or different. The R, R', and R" alkyl groups on a tetraalkylammonium group can each be an alkyl group having from 1 to 10 carbons, and preferably 4 carbons or less, such as a methyl group or an ethyl group. $R_3$ can be a polymethylene group of formula $(CH_2)_n$, where n=6. This type of cation can be referred to as a "diquat-6" cation. One example of a diquat-6 cation is a hexamethammonium cation, where $R_1$ and $R_2$ are the same, and R, R', and R" are each a methyl group. The anion portion of the diquat-6 salt can be chloride ions or other anions such as hydroxide, nitrate, sulfate, other halide and the like. For example, hexamethonium chloride is N,N,N,N',N',N'-hexamethyl-1,6-hexanediammonium dichloride.

In the synthesis of the ZSM-48 crystals, the reactants including silicate salt, aluminate salt, other metal oxide salt(s), base and directing agent can be mixed together with water in the ratios set forth above and heated with stirring at 100° C. to 250° C. The crystals may be formed from reactants or in the alternative, ZSM-48 seed crystals may be added to the reaction mixture. The ZSM-48 seed crystals may be added to enhance the rate of crystal formation but do not otherwise affect crystal morphology. The ZSM-48 crystals can be purified, usually by filtration, and washed with deionized water.

The as-synthesized ZSM-48 crystals should be at least partially dried prior to use or further treatment. Drying may be accomplished by heating at temperatures of from 100° C. to 400° C., preferably from 100° C. to 250° C. Pressures may be atmospheric or subatmospheric. If drying is performed under partial vacuum conditions, the temperatures may be lower than those at atmospheric pressures.

Catalysts can typically be bound with a binder or matrix material prior to use. Binders can be resistant to temperatures of the use desired and are attrition resistant. Binders may be catalytically active or inactive and include other zeolites, other inorganic materials such as clays and metal oxides such as alumina, silica and silica-alumina. Clays may be kaolin, bentonite and montmorillonite and are commercially available. They may be blended with other materials such as silicates. Other binary porous matrix materials in addition to silica-aluminas include materials such as silica-magnesia, silica-thoria, silica-zirconia, silica-beryllia and silica-titania. Ternary materials such as silica-alumina-magnesia, silica-alumina-thoria and silica-alumina-zirconia can also be suitable for use as binders. The matrix can be in the form of a co-gel. The bound ZSM-48 may range from 10 to 100 wt. % ZSM-48, based on bound ZSM-48 with the balance being binder.

ZSM-48 crystals as part of a catalyst may also be used with a metal hydrogenation component. Metal hydrogenation components may be from Groups 6-12 of the Periodic Table based on the IUPAC system having Groups 1-18, preferably Groups 6 and 8-10. Examples of such metals include Ni, Mo, Co, W, Mn, Cu, Zn, Ru, Pt or Pd, preferably Pt or Pd. Mixtures of hydrogenation metals may also be used such as Co/Mo, Ni/Mo, Ni/W and Pt/Pd, preferably Pt/Pd. The amount of hydrogenation metal or metals may range from 0.1 wt % to 30 wt. %, based on catalyst. For example, the amount of hydrogenation metals can be at least 0.1 wt %, or at least 0.3 wt %, or at least 0.5 wt %, or at least 0.75 wt %, or at least 1.0 wt %, or at least 1.5 wt %, or at least 2 wt %, or at least 5 wt %. Additionally or alternately, the amount of hydrogenation metals can be 30 wt % or less, such as 20 wt % or less, or 15 wt % or less, or 10 wt % or less, or 5 wt % or less, or 2 wt % or less. In aspects where the hydrogenation metal(s) are selected to be one or more noble metals, the amount of hydrogenation metals can preferably be 2 wt % or less, such as 1.5 wt % or less, or 1.0 wt % or less. The lower and upper range bounds identified above are explicitly contemplated as being combined in any convenient combination. Thus, the amount of hydrogenation metals can be 0.1 wt % to 2.0 wt %, or 0.1 wt % to 1.5 wt %, or 0.3 wt % to 2.0 wt %, or 0.3 wt % to 1.5 wt %, or 0.1 wt % to 15 wt %, or 1.0 wt % to 30 wt %, or 5 wt % to 30 wt %, or 2 wt % to 20 wt %, or any other convenient combination. Methods of loading metal onto ZSM-48 catalyst are well known and include, for example, impregnation of ZSM-48 catalyst with a metal salt of the hydrogenation component and heating. The ZSM-48 catalyst containing hydrogenation metal may also be sulfided prior to use. The catalyst may also be steamed prior to use.

The ZSM-48 crystals can have an Alpha value of 1 to 200, such as at least 5 or 10 or less. The alpha value test is a measure of the cracking activity of a catalyst and is described in U.S. Pat. No. 3,354,078 and in the Journal of Catalysis, Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the Journal of Catalysis, Vol. 61, p. 395.

To the extent desired, the original cations of the as-synthesized material, such as potassium cations or sodium cations, can be replaced in accordance with techniques well known in the art, at least in part, by ion exchange with other cations. Preferred replacing cations can include metal ions, hydrogen ions, hydrogen precursor, e.g., ammonium ions and mixtures thereof. Particularly preferred cations can be those which tailor the catalytic activity for certain hydrocarbon conversion reactions. These can include hydrogen, rare earth metals and metals of Groups IIA, IIIA, IVA, VA, IB, IIB, IIIB, IVB, VB, VIB, VIIB and VIII of the Periodic Table of the Elements.

The crystalline material of this disclosure, when employed either as an adsorbent or as a catalyst in an organic compound conversion process can be dehydrated, at least partially. This can be done by heating to a temperature in the range of 200° C. to 370° C. in an atmosphere such as air or nitrogen, and at atmospheric, subatmospheric or superatmospheric pressures for between 30 minutes and 48 hours. Dehydration can also be performed at room temperature merely by placing the ZSM-48 in a vacuum, but a longer time is required to obtain a sufficient amount of dehydration.

Optionally, the crystals can also be calcined at a temperature of 350° C. to 925° C. for 1 to 20 minutes. To reach the calcination temperature, the temperature of the oven or other device for heating the crystals can be raised in increments of 50° C., 100° C., or another convenient increment. The crystals can be held at the incremental temperatures for a period of time prior to continuing to increase the temperature to the desired final calcination temperature. The incremental heating can allow water vapor to exit the crystal structure while reducing or minimizing damage and/or morphology changes in the crystals.

The crystalline molecular sieve produced by the present process can be used to catalyze a wide variety of organic compound conversion processes including many of present commercial/industrial importance. Examples of chemical conversion processes effectively catalyzed by the crystalline material of this disclosure, by itself or in combination with one or more other catalytically active substances including other crystalline catalysts, can include those requiring a catalyst with acid activity. Specific examples can include, but are not limited to:

(a) alkylation of aromatics with short chain ($C_2$-$C_6$) olefins, e.g., alkylation of ethylene or propylene with benzene to produce ethylbenzene or cumene respectively, in the gas or liquid phase, with reaction conditions optionally including one or more of a temperature from 10° C. to 250° C., a pressure from 0 psig to 500 psig (3.5 MPag), a total weight hourly space velocity (WHSV) from 0.5 $hr^{-1}$ to 100 $hr^{-1}$, and an aromatic/olefin mole ratio from 0.1 to 50;

(b) alkylation of aromatics with long chain ($C_{10}$-$C_{20}$) olefins, in the gas or liquid phase, with reaction conditions optionally including one or more of a temperature from 250° C. to 500° C., a pressure from 0 psig to 500 psi, (3.5 MPag), a total WHSV from 0.5 $hr^{-1}$ to 50 $hr^{-1}$, and an aromatic/olefin mole ratio from 1 to 50;

(c) transalkylation of aromatics, in gas or liquid phase, e.g., transalkylation of polyethylbenzenes and/or polyisopropylbenzenes with benzene to produce ethylbenzene and/or cumene respectively, with reaction conditions optionally including one or more of a temperature from 100° C. to 500° C., a pressure from 1 psig (7 kPag) to 500 psig (3.5 MPag), and a WHSV from 1 $hr^{-1}$ to 10,000 $hr^{-1}$;

(d) disproportionation of alkylaromatics, e.g., disproportionation of toluene to produce xylenes, with reaction conditions optionally including one or more of a temperature from 200° C. to 760° C., a pressure from 1 atm (0 psig) to 60 atm (5.9 MPag), a WHSV from 0.1 $hr^{-1}$ to 20 $hr^{-1}$, and a hydrogen/hydrocarbon mole ratio from 0 (no added hydrogen) to 50;

(e) dealkylation of alkylaromatics, e.g., deethylation of ethylbenzene, with reaction conditions optionally including one or more of a temperature from 200° C. to 760° C., a pressure from 1 atm (0 psig) to 60 atm (5.9 MPag), a WHSV from 0.1 $hr^{-1}$ to 20 $hr^{-1}$, and a hydrogen to hydrocarbon mole ratio from 0 (no added hydrogen) to 50;

(f) isomerization of alkylaromatics, such as xylenes, with reaction conditions optionally including one or more of a temperature from 200° C. to 540° C., a pressure from 100 kPaa to 7 MPaa, a WHSV from 0.1 $hr^-$ to 50 $hr^-$, and a hydrogen/hydrocarbon mole ratio from 0 (no added hydrogen) to 10;

(g) reaction of paraffins with aromatics, e.g., to form alkylaromatics and light gases, with reaction conditions optionally including one or more of a temperature from 260° C. to 375° C., a pressure from 0 psig to 1000 psig (6.9 MPag), a WHSV from 0.5 $hr^{-1}$ to 10 $hr^{-1}$, and a hydrogen/hydrocarbon mole ratio from 0 (no added hydrogen) to 10;

(h) paraffin isomerization to provide branched paraffins with reaction conditions optionally including one or more of a temperature from 200° C. to 315° C., a pressure from 100 psig (690 kPag) to 1000 psig (6.9 MPag), a WHSV from 0.5 $hr^{-1}$ to 10 $hr^{-1}$, and a hydrogen to hydrocarbon mole ratio from 0.5 to 10;

(i) alkylation of iso-paraffins, such as isobutane, with olefins, with reaction conditions optionally including one or more of a temperature from –20° C. to 350° C., a pressure from 0 psig to 700 psig (4.9 MPag), and a total olefin WHSV from 0.02 $hr^{-1}$ to 10 $hr^{-1}$;

(j) dewaxing of paraffinic feeds or other hydrocarbonaceous feedstocks, such as petroleum feedstocks; with reaction conditions optionally including one or more of a temperature from 200° C. to 450° C., a pressure from 0 psig to 1000 psig (6.9 MPag), a WHSV from 0.2 $hr^{-1}$ to 10 $hr^{-1}$, and a hydrogen/hydrocarbon mole ratio from 0.5 to 10;

(k) cracking of hydrocarbons with reaction conditions optionally including one or more of a temperature from 300° C. to 700° C., a pressure from 0.1 atm (10 kPag) to 30 atm (3 MPag), and a WHSV from 0.1 $hr^{-1}$ to 20 $hr^{-1}$;

(l) isomerization of olefins with reaction conditions optionally including one or more of a temperature from 250° C. to 750° C., an olefin partial pressure from 30 kPa to 300 kPa, and a WHSV from 0.5 $hr^{-1}$ to 500 $hr^{-1}$; and (m) a hydrocarbon trap (e.g., pre-catalytic converter adsorbent) for cold start emissions in motor vehicles.

Other Embodiments and PCT/EP Clauses

Additionally or alternatively, the present disclosure can include one or more of the following embodiments.

Embodiment 1

A method of dewaxing a hydrocarbonaceous feedstock, comprising: exposing a feedstock under effective dewaxing conditions to a catalyst comprising ZSM-48 crystals containing at least one of titania, zirconia, or zinc oxide as a framework metal oxide in a ZSM-48 structural framework, a molar ratio of $SiO_2$ to the framework metal oxide in the ZSM-48 structural framework being 70 to 200, a molar ratio of $SiO_2$ to $Al_2O_3$ in the ZSM-48 structural framework being at least 120.

Embodiment 2

The method of Embodiment 1, wherein the ZSM-48 crystals have a molar ratio of $SiO_2$ to $Al_2O_3$ in the ZSM-48 structural framework of 120 to 225.

Embodiment 3

The method of Embodiment 1, wherein the ZSM-48 crystals are substantially free of intentionally added alumina. 4. The method of claim 1, wherein the ZSM-48 crystals have a molar ratio of $SiO_2$ to $Al_2O_3$ in the ZSM-48 structural framework of at least 500.

Embodiment 5

The method of any of the above embodiments, wherein the framework metal oxide is titania.

Embodiment 6

The method of any of the above embodiments, wherein the effective dewaxing conditions comprise a temperature from 200° C. to 450° C., a pressure from 0 psig to 1000 psig (6.9 MPag), a WHSV from 0.2 $hr^{-1}$ to 10 $hr^{-1}$, and a hydrogen/hydrocarbon mole ratio from 0.5 to 10.

Embodiment 7

The method of any of the above embodiments, wherein the catalyst further comprises a metal oxide binder.

Embodiment 8

The method of any of the above embodiments, wherein the catalyst further comprises a metal hydrogenation component.

Embodiment 9

The method of Embodiment 8, wherein the metal hydrogenation component comprises a group VIII metal, a Group VIB metal, or a combination thereof.

Embodiment 10

The method of Embodiment 8 or 9, wherein the metal hydrogenation component comprises 0.1 wt % to 1.5 wt % of Pt, Pd, or a combination thereof.

Embodiment 11

A method of synthesizing ZSM-48 crystals containing at least one of titania, zirconia, or zinc oxide as a framework metal oxide in a zeolite structural framework, the method comprising crystallizing a reaction mixture comprising a source of water, a source of $SiO_2$, a source of the framework metal oxide, a source of an alkali metal M, and a source of a structure directing agent in the form of an organic cation, Q, the reaction mixture having a molar ratio of structure directing agent cation, Q, to $SiO_2$ in said reaction mixture of 0.01 to 0.2; a molar ratio of $SiO_2$ to framework metal oxide in said reaction mixture of 50 to 225; a molar ratio of water to $SiO_2$ in said reaction mixture of 1 to 500; a molar ratio of hydroxyl group concentration to $SiO_2$ in said reaction mixture of from 0.1 to 0.5; a molar ratio of alkali metal, M, to $SiO_2$ in said reaction mixture of from 0.05 to 0.5; and a molar ratio of $SiO_2$ to $Al_2O_3$ in said reaction mixture of at least 120.

Embodiment 12

The method of Embodiment 11, wherein the structure directing agent cation Q is a hexamethonium cation.

Embodiment 13

The method of Embodiment 11 or 12, wherein the reaction mixture further comprises a source of $Al_2O_3$, a molar ratio of $SiO_2$ to $Al_2O_3$ in said reaction mixture being 120 to 225.

Embodiment 14

The method of Embodiment 11 or 12, wherein the reaction mixture is substantially free of a source of intentionally added $Al_2O_3$.

Embodiment 15

The method of any of embodiments 11-14, wherein the reaction mixture further comprises seeds of ZSM-48 in an amount such that a weight percent of seeds relative to total weight of $SiO_2$ in said reaction mixture is between 0.1 wt % and 20 wt %.

Embodiment 16

The method of any of embodiments 11-15, wherein the framework metal oxide is titania.

Embodiment 17

The method of any of embodiments 1-10, wherein the ZSM-48 crystals are synthesized according to any of embodiments 11-15.

EXAMPLES

Comparative Example 1

Highly Siliceous Si-ZSM-48 (Si/Al2~700/1)

A mixture was prepared from 1030 g of water, 100 g of Hexamethonium Chloride (56% solution), 276 g of an Ultrasil™ silica, 1.0 g of sodium aluminate solution (45%), and 65 g of 50% sodium hydroxide solution. The mixture had the following molar composition:
$SiO_2/Al_2O_3$~696
$H_2O/SiO_2$~14.9
$OH^-/SiO_2$~0.19
$Na^+/SiO_2$~0.19
Template/$SiO_2$~0.05

The mixture was reacted at 320° F. (160° C.) in a 2-liter autoclave with stirring at 250 RPM for 48 hours. The product was filtered, washed with deionized (DI) water and dried at 250° F. (120° C.). The XRD pattern of the as-synthesized material showed the typical pure phase of ZSM-48 topology. The as-synthesized crystals were converted into the hydrogen form by two ion exchanges with ammonium nitrate solution at room temperature, followed by drying at 250° F. (120° C.) and calcination at 1000° F. (540° C.) for 6 hours. The resulting ZSM-48 crystals had a $SiO_2/Al_2O_3$ molar ratio of ~600/1, an Alpha value of <10.

Example 2

Ti-ZSM-48: Example 2a: $SiO_2/(TiO_2)_2$~80/1);
Example 2b: $SiO_2/(TiO_2)_2$~120/1

For example 2a, a mixture was prepared from 1121 g of water, 31 g of Hexamethonium Chloride (56% solution), 217.3 g of an Ultrasil™ silica, 19.2 g of titanium ethoxide in 20 g of ethanol, 10 g of ZSM-48 seeds, and 21 g of 50% sodium hydroxide solution. For example 2b, a mixture was prepared from 1121 g of water, 31 g of Hexamethonium Chloride (56% solution), 217.3 g of an Ultrasil™ silica, 12.8 g of titanium ethoxide in 20 g of ethanol, 10 g of ZSM-48 seeds, and 21 g of 50% sodium hydroxide solution. The mixtures had the following molar composition:

$SiO_2/(TiO_2)_2$=80/1 & 120/1
$H_2O/SiO_2$=19.5
$OH^-/SiO_2$=0.08
$Na^+/SiO_2$=0.08
Template/$SiO_2$~0.02

The mixture was reacted at 320° F. (160° C.) in a 2-liter autoclave with stirring at 250 RPM for 96 hours. The product was filtered, washed with deionized (DI) water and dried at 250° F. (120° C.). The XRD pattern of the as-synthesized material showed the typical pure phase of ZSM-48 topology. The SEM of the 80:1 as-synthesized material is shown in FIG. 1. The SEM in FIG. 1 shows agglomerates of rod or needle-like crystals. The as-synthesized crystals were converted into the hydrogen form by two ion exchanges with ammonium nitrate solution at room temperature, followed by drying at 250° F. (120° C.) and calcination at 1000° F. (540° C.) for 6 hours. The resulting ZSM-48 crystals had a $TiO_2$ content of 1.64 & 1.22 wt %, and an Alpha value of <10.

Example 3

Zn-ZSM-48

A mixture was prepared from 1121 g of water, 31 g of Hexamethonium Chloride(56% solution), 217.3 g of Ultrasil, 2.92 g of $ZnCl_2$ in 20 g of deionized water, 10 g of ZSM-48 seeds, and 21 g of 50% sodium hydroxide solution. The mixture had the following molar composition:

$SiO_2/(ZnO)2$~80/1
$H_2O/SiO_2$~19.5
$OH^-/SiO_2$~0.08
$Na^+/SiO_2$~0.08
Template/$SiO_2$~0.02

Figure 2:
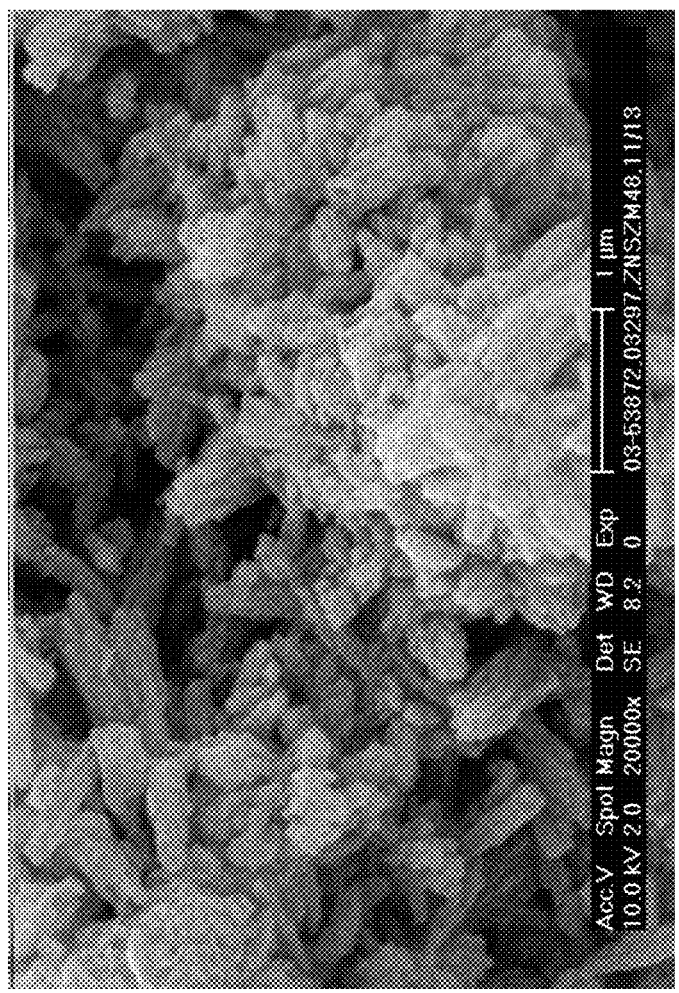
FIG. 2 shows an SEM image of ZSM-48 crystals.

The mixture was reacted at 320° F. (160° C.) in a 2-liter autoclave with stirring at 250 RPM for 96 hours. The product was filtered, washed with deionized (DI) water and dried at 250° F. (120° C.). The XRD pattern of the as-synthesized material showed the typical pure phase of ZSM-48 topology. The SEM of the as-synthesized material is shown in FIG. 2. The SEM in FIG. 2 shows agglomerates of rod or needle-like crystals. The as-synthesized crystals were converted into the hydrogen form by two ion exchanges with ammonium nitrate solution at room temperature, followed by drying at 250° F. (120° C.) and calcination at 1000° F. (540° C.) for 6 hours. The resulting ZSM-48 crystals had a ZnO content of 0.58 wt %, and an Alpha value of <10.

Example 4

Zr-ZSM-48

A mixture was prepared from 1121 g of water, 31 g of Hexamethonium Chloride(56% solution), 217.3 g of Ultrasil, 6.90 g of zirconyl chloride ($ZrOCl_2 \cdot 8H_2O$) in 20 g of deionized water, 10 g of ZSM-48 seeds, and 21 g of 50% sodium hydroxide solution. The mixture had the following molar composition:

$SiO_2/(ZrO2)2$~80/1
$H_2O/SiO_2$~19.5
$OH^-/SiO_2$~0.08
$Na^+/SiO_2$~0.08
Template/$SiO_2$~0.02

Figure 3:
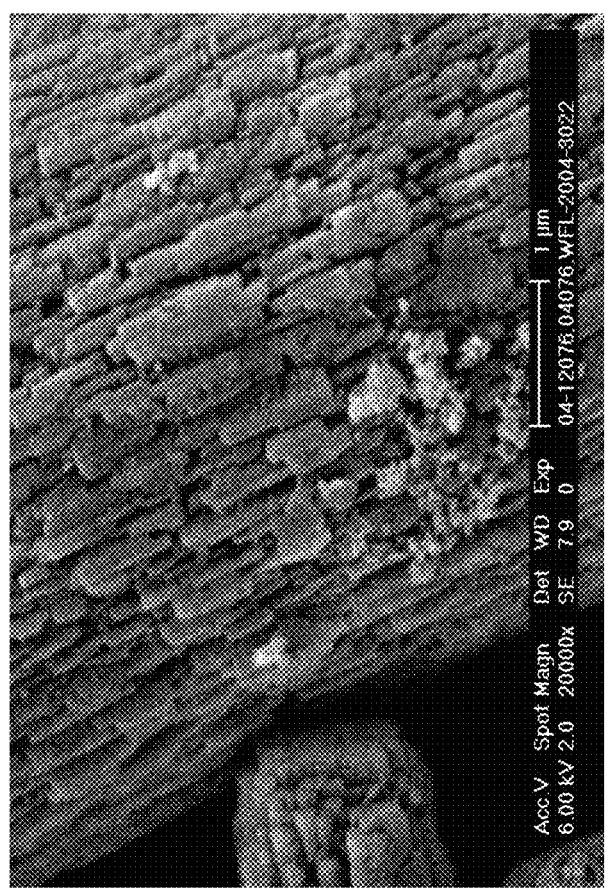
FIG. 3 shows an SEM image of ZSM-48 crystals.

The mixture was reacted at 320° F. (160° C.) in a 2-liter autoclave with stirring at 250 RPM for 96 hours. The product was filtered, washed with deionized (DI) water and dried at 250° F. (120° C.). The XRD pattern of the as-synthesized material showed the typical pure phase of ZSM-48 topology. The SEM of the as-synthesized material is shown in FIG. 3. The SEM in FIG. 3 shows agglomerates of rod or needle-like crystals. The as-synthesized crystals were converted into the hydrogen form by two ion exchanges with ammonium nitrate solution at room temperature, followed by drying at 250° F. (120° C.) and calcination at 1000° F. (540° C.) for 6 hours. The resulting ZSM-48 crystals had a $ZrO_2$ content of 0.88%, and an Alpha value of <10.

Example 5

Al,Ti-ZSM-48 ($SiO_2/(TiO_2)_2$~80/1, $SiO_2/Al_2O_3$~210/1)

A mixture was prepared from 1100 g of water, 31 g of Hexamethonium Chloride (56% solution), 217.3 g of Ultrasil, 19.2 g of titanium ethoxide in 20 g of ethanol, 5.2 g of sodium aluminate solution (45%), 10 g of ZSM-48 seeds, and 32 g of 50% sodium hydroxide solution. The mixture had the following molar composition:

$SiO_2/(TiO_2)_2$~80
$SiO_2/Al_2O_3$~210
$H_2O/SiO_2$~19.3
$OH^-/SiO_2$~0.13
$Na^+/SiO_2$~0.13
Template/$SiO_2$~0.02

The mixture was reacted at 320° F. (160° C.) in a 2-liter autoclave with stirring at 250 RPM for 48 hours. The product was filtered, washed with deionized (DI) water and dried at 250° F. (120° C.). The XRD pattern of the as-synthesized material showed the typical pure phase of ZSM-48 topology. The as-synthesized crystals were converted into the hydrogen form by two ion exchanges with ammonium nitrate solution at room temperature, followed by drying at 250° F. (120° C.) and calcination at 1000° F. (540° C.) for 6 hours. The resulting ZSM-48 crystals had a $SiO_2/Al_2O_3$ molar ratio of 209 (to 1), and an Alpha value of <10.

Example 6

Zn,Al-ZSM-48 ($SiO_2/(ZnO)_2$~80/1, $SiO_2/Al_2O_3$~150/1)

A mixture was prepared from 1080 g of water, 47 g of Hexamethonium Chloride(56% solution), 217.3 g of Ultrasil PM, 2.92 g of $ZnCl_2$ in 20 g of deionized water, 5.9 g of sodium aluminate solution (45%), 10 g of ZSM-48 seeds, and 29 g of 50% sodium hydroxide solution. The mixture had the following molar composition:

$SiO_2/(ZnO)_2$~80/1
$SiO_2/Al_2O_3$~160
$H_2O/SiO_2$~19.0
$OH^-/SiO_2$~0.12
$Na^+/SiO_2$~0.12
Template/$SiO_2$~0.03

The mixture was reacted at 320° F. (160° C.) in a 2-liter autoclave with stirring at 250 RPM for 48 hours. The product was filtered, washed with deionized (DI) water and dried at 250° F. (120° C.). The XRD pattern of the as-synthesized material showed the typical pure phase of ZSM-48 topology. The as-synthesized crystals were converted into the hydrogen form by two ion exchanges with ammonium nitrate solution at room temperature, followed by drying at 250° F. (120° C.) and calcination at 1000° F. (540° C.) for 6 hours. The resulting ZSM-48 crystals had a $SiO_2/Al_2O_3$ molar ratio of 147 (to 1), and an Alpha value of <10.

Examples 7-12

Preparations of 0.6% Pt on ZSM-48/Alumina(65/35) Steamed & Non-Steamed Catalysts Alumina-bound ZSM-48 (ZSM-48/$Al_2O_3$) catalysts were prepared from 65 parts of Na-form ZSM-48 crystal produced in Examples 1, 2, 3, 4, 5, 6 mixed with 35 parts of LaRoche Versal 300 alumina on a dry basis. The mixture was mulled and formed into 1/16" cylindrical extrudates. The prepared extrudates were dried at 250° F. (120° C.) and calcined at 1000° F. (540° C.) for 6 hours. The extrudates were converted into the hydrogen form by three ion exchanges with ammonium nitrate solution at room temperature, followed by drying at 250° F. (120° C.) and calcination at 1000° F. (540° C.) for 6 hours. For some catalysts, steamed extrudates were prepared by steaming in 100% steam at 900° F. (482° C.) for 4 hours before Pt metal impregnation.

The steamed and non-steamed extrudates were then impregnated with a platinum tetraammine nitrate solution via incipient wetness impregnation to give 0.6 wt % Pt on the extrudates. The extrudates were dried at 250° F. (120° C.) for 2 hours and then calcined at 680° F. with air flow of 200 cc/min for 2 hours in a tube furnace.

Example 13

Adsorption and Acidity Properties of Synthesized ZSM-48 Crystals

One method for characterizing zeolite crystals is based on the adsorption of various compounds. This can provide a method for characterizing the pore size and/or pore volume of the zeolite crystals. For the ZSM-48 crystals synthesized in Examples 1-5, adsorption values for uptake of 4 different compounds are shown in Table 1. The final row of Table 1 provides a comparison with ZSM-48 crystals having a silica to alumina ratio of 190:1. Adsorption properties of the crystals were evaluated using n-hexane, 2,2 dimethyl butane, 2,3 dimethyl butane, and 3 methyl pentane. The data in Table 1 represents mg of absorbed organic compound per gram of zeolite. Table 1 shows that the adsorption volume of siliceous or Ti-containing ZSM-48 crystals decreased considerably relative to the adsorption volume of Al, Zr, or Zn-containing ZSM-48 crystals.

TABLE 1

| Probe | N-Hexane | 2,2 DMB | 2,3 DMB | 3MP |
|---|---|---|---|---|
| Example 1 | 16 | ~0 | 3 | 4 |
| Example 2a | 21 | ~0 | 5 | 8 |
| Example 2b | 9.5 | ~0 | 2 | 3 |
| Example 3 | 41 | 5 | 11 | 23 |
| Example 4 | 44 | 1 | 5 | 24 |
| Example 5 | 19.3 | 2.2 | 6 | 5.7 |
| ZSM-48 ($SiO_2/Al_2O_3$~190/1) | ~40 | 3 | 9 | 12 |

Another method for characterizing zeolite crystals is based on acid strength, such as by determining the acid strength using the Alpha test as described above. The relative acid strength (measured by Alpha) of the resulting crystals is: Al-ZSM-48>>Ti, Zn, Zr-ZSM-48 (Alpha<10) ~ZSM-48 ($SiO_2/Al_2O_3$~700/1).

Example 14

Characterization of Dewaxing Activity and Selectivity—Feed and Reaction Conditions Some of the crystals from Examples 7-12 were tested by exposing the crystals to a model feed under effective dewaxing conditions. The model feed was a four-component system of 60 wt % of n-hexadecane (99%, Aldrich); 30 wt % 2,4,10,14-tetramethylpentadecane (98% Acros); and 5 wt % of 1-phenyloctane (99%, Aldrich); and 5% isopropyl-naphthalene. The feed system was designed to simulate a representative waxy feed composition.

The hydrodewaxing studies were performed using a continuous catalyst testing unit composed of a liquid feed system with an ISCO syringe pump, a fixed-bed tubular reactor with a three-zone furnace, liquid product collection, and an on-line MTI GC for gas analysis. Typically, 10 cc of catalyst was sized and charged in a down-flow 3/8" stainless steel reactor containing a 1/8" thermowell. After the unit was pressure tested, the catalyst was dried at 300° C. for 2 hours with 250 cc/min $N_2$ at ambient pressure. 2% $H_2S$ in hydrogen was flowed through the catalyst bed at 100 sccm for 1 hour to pre-sulfide the catalyst. Upon completion of the catalyst treatment, the reactor was cooled to 150° C., the unit pressure was set to 600 psig, and the gas flow was switched from $N_2$ to $H_2$. Liquid feedstock was introduced into the reactor at 2 $hr^{-1}$ liquid hourly space velocity (LHSV). Once the liquid feed reached a downstream knockout pot, the reactor temperature was increased to the target value. A material balance (MB) was initiated until the unit was lined out for 6 hours. The total liquid product (TLP) was collected in the MB dropout pot and analyzed by an HP 5880 gas chromatograph (GC) with FID.

Example 15

Characterization of Dewaxing Activity and Selectivity—Comparison of Metal-Substituted ZSM-48

This example illustrates the catalytic performance of various Pt/Metal-substituted ZSM-48/$Al_2O_3$ (steamed) catalysts. Comparative values are also provided for a Pt/Si-ZSM-48/$Al_2O_3$ catalyst (Si/$Al_2O_3$~700/1, steamed) and a Pt/Al-ZSM-48/$Al_2O_3$ catalyst (Si/$Al_2O_3$~190/1, steamed).

All catalysts were evaluated using the operating procedure described in Example 14 at the following conditions: T=270-380° C., P=600 psig, liquid model feed rate=10 cc/hr, $H_2$ circulation rate=2500 scf/bbl, and LHSV=2 $hr^{-1}$.

Figure 4:
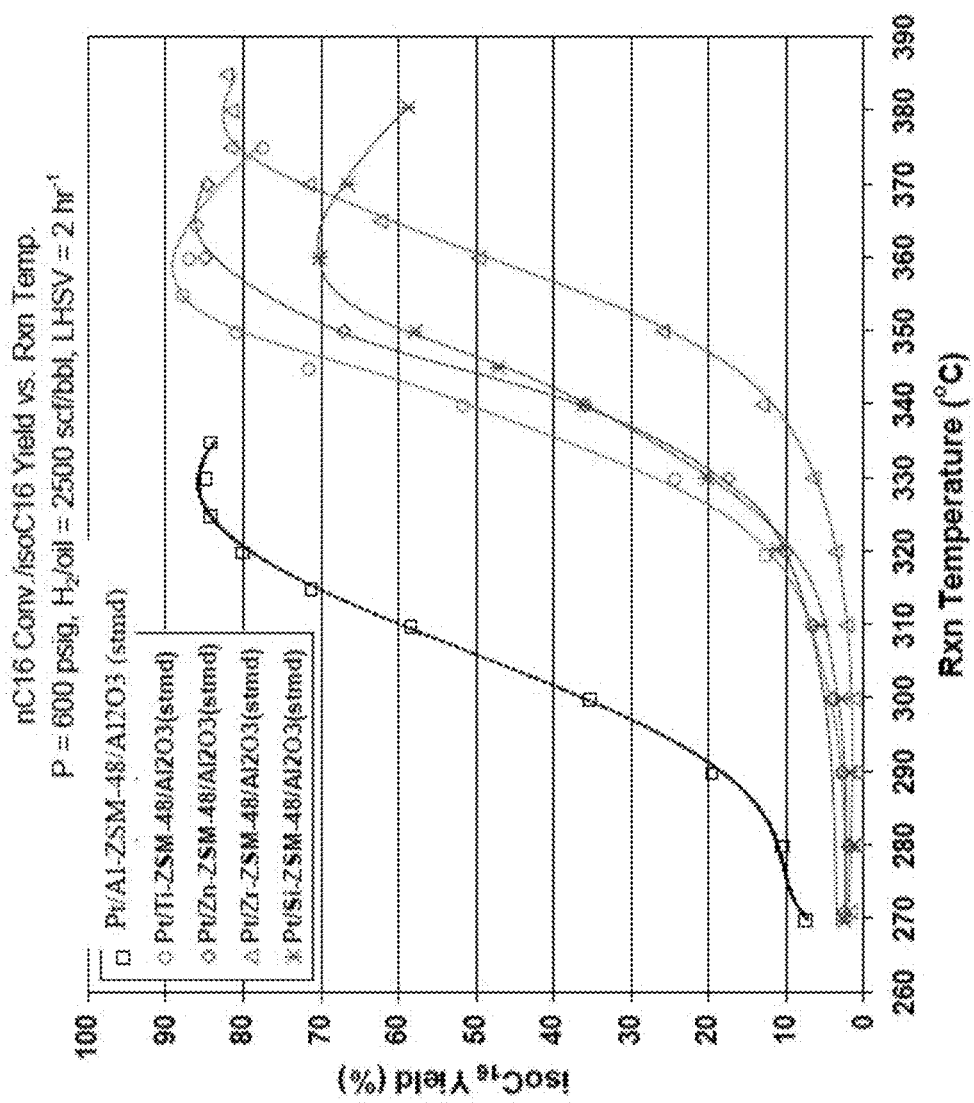
FIG. 4 shows an example of catalytic isomerization activity and yield for various ZSM-48 catalysts.

The n-hexadecane (nC16) isomerization yields are summarized in FIG. 4. The nC16 conversion was seen to increase with increasing reactor temperatures.

Based on the data shown in FIG. 4, the catalyst activity of the various catalysts was ranked in the following order: Pt/Al-ZSM-48/Al$_2$O$_3$ (Si/Al$_2$O$_3$~190/1, stmd)>Pt/Ti-ZSM-48/Al$_2$O$_3$(stmd)>Pt/Zn-ZSM-48/Al$_2$O$_3$ (stmd)>Pt/Si-ZSM-48/Al$_2$O$_3$ (stmd)>Pt/Zr-ZSM-48/Al$_2$O$_3$ (stmd). Thus, the Al-ZSM-48 catalyst provided the highest activity while the Zr-ZSM-48 catalyst provided the lowest activity. In fact, incorporation of Zr into the framework actually reduced the activity of the Zr-ZSM-48 for isomerization relative to the highly siliceous (SiO$_2$:Al$_2$O$_3$ 700/1) ZSM-48 crystals.

Based on the data shown in FIG. 4, the iso-C16 yield of the various catalysts was ranked in the following order: Pt/Ti-ZSM-48/Al$_2$O$_3$(stmd)>Pt/Zn-ZSM-48/Al$_2$O$_3$ (stmd) ~Pt/Al-ZSM-48/Al$_2$O$_3$ (Si/Al$_2$O$_3$~190/1, stmd)>Pt/Zr-ZSM-48/Al$_2$O$_3$ (stmd)>Pt/Si-ZSM-48/Al$_2$O$_3$ (stmd). Thus, the Ti-ZSM-48 provided the highest potential isomerization yield, while the highly siliceous ZSM-48 had the lowest potential isomerization yield.

Based on FIG. 4, at similar isomerization activity, the isomerization yield of Pt/Si-ZSM-48/Al$_2$O$_3$ is 20% less than the catalyst with Ti substitution in the ZSM-48 framework. As shown in the absorption data in Table-1, The Pt/Ti-ZSM-48/Al$_2$O$_3$ crystal also exhibits roughly the lowest adsorption capacity for the various organic compounds. Without being bound by any particular theory, the data in FIG. 4 and Table 1 may indicate that incorporation of Ti into the ZSM-48 zeolite framework results in a modification of the pore structure which results in the enhanced isomer yield of Pt/Ti-ZSM-48/Al$_2$O$_3$.

Example 16

Characterization of Dewaxing Activity and Selectivity—Comparison of Ti-Substituted ZSM-48

This example illustrates the catalytic performance of Pt/Ti-substituted ZSM-48/Al$_2$O$_3$ catalysts with and without incorporation of additional alumina into the framework structure.

Two Ti-ZSM-48/Al$_2$O$_3$ catalysts with different Ti loading (1.22% and 1.64%) and SiO$_2$/Al$_2$O$_3$ molar ratio (200 and >1000) were evaluated using the operating procedure described in Example 14 at the following conditions: T=270-380° C., P=600 psig, liquid rate=10 cc/hr, H$_2$ circulation rate=2500 scf/bbl, and LHSV=2 hr$^{-1}$. The catalytic performance of Pt/Al-ZSM-48/Al$_2$O$_3$ (Si/Al$_2$O$_3$~190/1, stmd) and Pt/Si-ZSM-48/Al$_2$O$_3$(stmd) were also determined for comparison. The n-hexadecane (nC16) isomerization yield is summarized in FIG. 5.

At >90% nC16 conversion to iso-C16, Pt/Ti-ZSM-48/Al$_2$O$_3$(stmd) gave the highest isoC$_{16}$ yield improvement (>3%) relative to Pt/Al-ZSM-48/Al$_2$O$_3$ (Si/Al$_2$O$_3$~190/1, stmd). Based on the data in FIG. 5, the isoC$_{16}$ yield is ranked as Pt/Ti-ZSM-48/Al$_2$O$_3$(stmd)>Pt/Ti—Al-ZSM-48/Al$_2$O$_3$ (stmd)~Pt/Al-ZSM-48/Al$_2$O$_3$ (Si/Al$_2$O$_3$~190/1, stmd)>Pt/Si-ZSM-48/Al$_2$O$_3$(stmd). Thus, incorporation of Ti into the ZSM-48 framework without added alumina provided a potential yield advantage, but inclusion of both Ti and additional Al into the framework resulted in catalysts with similar maximum potential yields.

Figure 5:
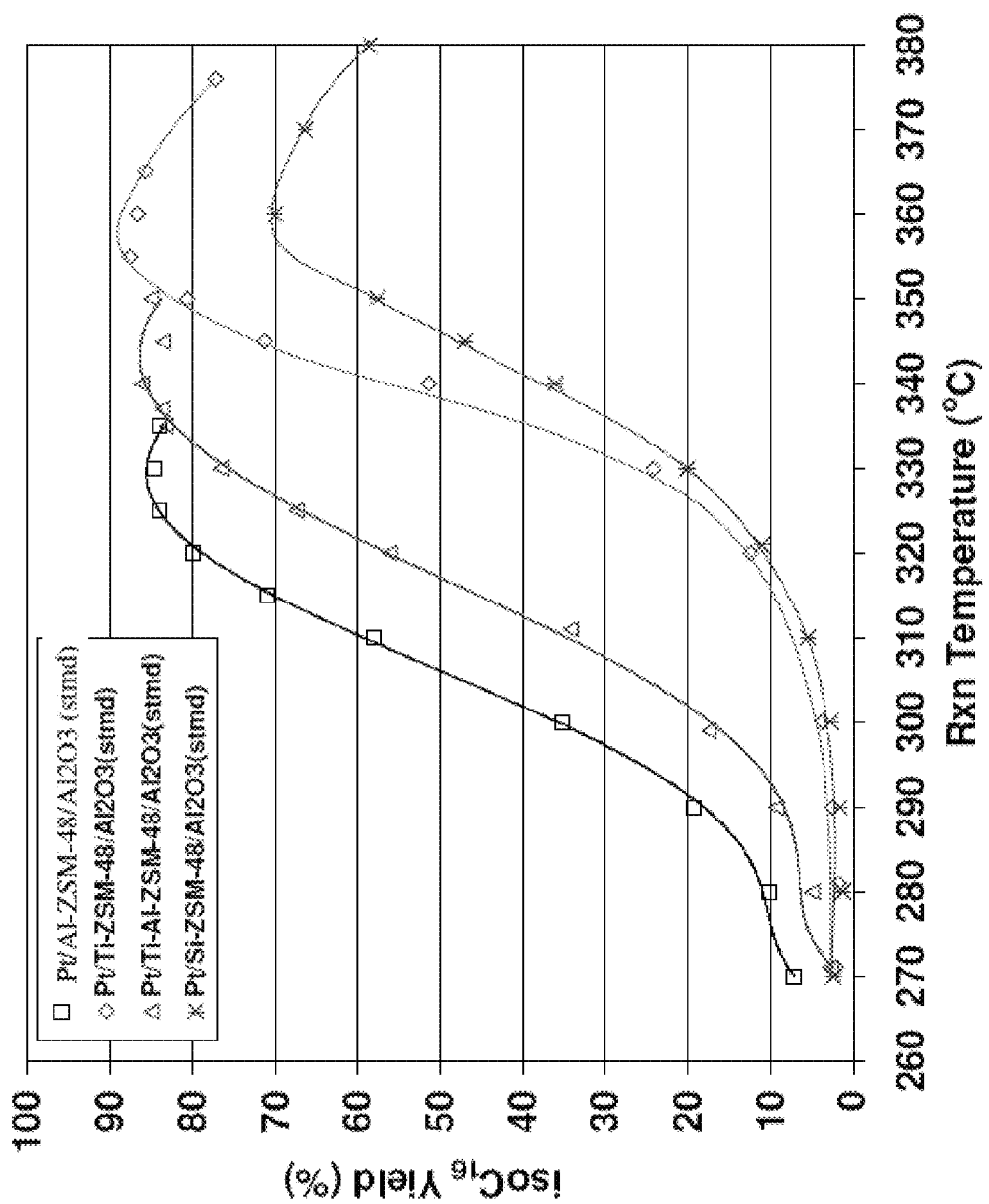
FIG. 5 shows an example of catalytic isomerization activity and yield for various ZSM-48 catalysts.

Based on the data in FIG. 5, the highest activity was provided by the Pt/Al-ZSM-48/Al$_2$O$_3$ (Si/Al$_2$O$_3$~190/1, stmd) catalyst. Addition of Ti to the framework reduced this activity, while removing the additional alumina from the Ti-ZSM-48 catalyst still further reduced this activity. This suggests that the alumina content of Ti-ZSM-48 catalysts can be used to control the activity of the catalyst to achieve a desired level of activity.

Although the present disclosure has been described in terms of specific embodiments, it is not so limited. Suitable alterations/modifications for operation under specific conditions should be apparent to those skilled in the art. It is therefore intended that the following claims be interpreted as covering all such alterations/modifications as fall within the true spirit/scope of the disclosure.

What is claimed is:

1. A method of dewaxing a hydrocarbonaceous feedstock, comprising:
    exposing a feedstock under effective dewaxing conditions to a catalyst comprising ZSM-48 crystals containing at least one of titania, zirconia, or zinc oxide as a framework metal oxide in a ZSM-48 structural framework, a molar ratio of SiO$_2$ to the framework metal oxide in the ZSM-48 structural framework being 70 to 200, a molar ratio of SiO$_2$ to Al$_7$O$_3$ in the ZSM-48 structural framework of 120 to 225.

2. The method of claim 1, wherein the ZSM-48 crystals are substantially free of intentionally added alumina.

3. The method of claim 1, wherein the framework metal oxide is titania.

4. The method of claim 1, wherein the effective dewaxing conditions comprise a temperature from 200° C. to 450° C., a pressure from 0 psig to 1000 psig 6.9 MPag), a WHSV from 0.2 hr$^{-1}$ to 10 hr$^{-1}$, and a hydrogen/hydrocarbon mole ratio from 0.5 to 10.

5. The method of claim 1, wherein the catalyst further comprises a metal oxide binder.

6. The method of claim 1, wherein the catalyst further comprises a metal hydrogenation component.

7. The method of claim 6, wherein the metal hydrogenation component comprises a group VIII metal, a Group VIB metal, or a combination thereof.

8. The method of claim 6, wherein the metal hydrogenation component comprises 0.1 wt % to 1.5 wt % of Pt, Pd, or a combination thereof.

9. A method of synthesizing ZSM-48 crystals containing at least one of titania, zirconia, or zinc oxide as a framework metal oxide in a zeolite structural framework, the method comprising crystallizing a reaction mixture comprising a source of water, a source of SiO$_2$, a source of the framework metal oxide, a source of an alkali metal M, and a source of a structure directing agent in the form of an organic cation, Q,
    the reaction mixture having a molar ratio of structure directing agent cation, Q, to SiO$_2$ in said reaction mixture of 0.01 to 0.2; a molar ratio of SiO$_2$ to framework metal oxide in said reaction mixture of 50 to 225; a molar ratio of water to SiO$_2$ in said reaction mixture of 1 to 500; a molar ratio of hydroxyl group concentration to SiO$_2$ in said reaction mixture of from 0.1 to 0.5; a molar ratio of alkali metal, M, to SiO$_2$ in said reaction mixture of from 0.05 to 0.5; and a molar ratio of SiO$_2$ to Al$_2$O$_3$ in said reaction mixture of 120 to 225.

10. The method of claim 9, wherein the structure directing agent cation Q is a hexamethonium cation.

11. The method of claim 9, wherein the reaction mixture is substantially free of a source of intentionally added Al$_2$O$_3$.

12. The method of claim 9, wherein the reaction mixture further comprises seeds of ZSM-48 in an amount such that a weight percent of seeds relative to total weight of $SiO_2$ in said reaction mixture is between 0.1 wt % and 20 wt %.

13. The method of claim 9, wherein the framework metal oxide is titania.

* * * * *